May 10, 1932.  A. I. MARCUM  1,857,248
VEHICLE DRIVE
Filed Nov 27, 1925  2 Sheets-Sheet 1
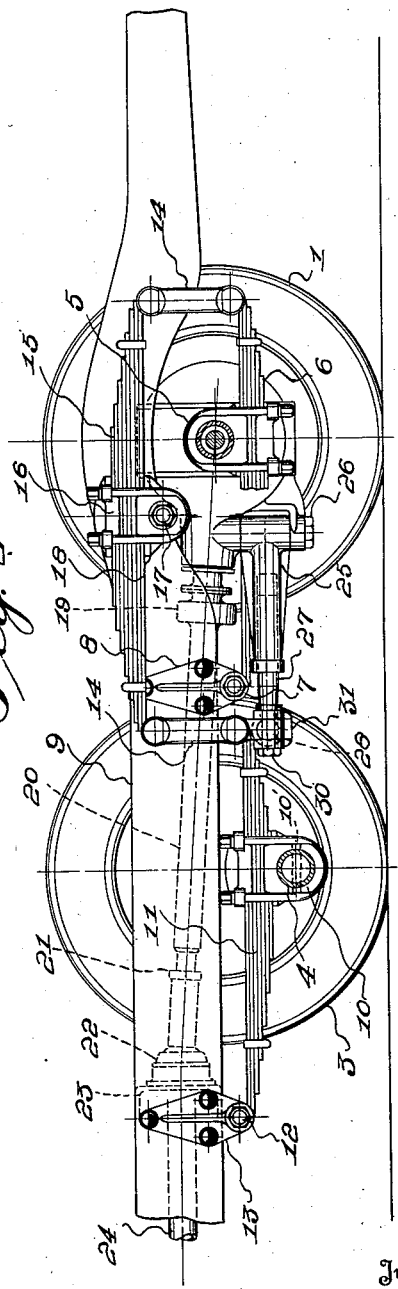
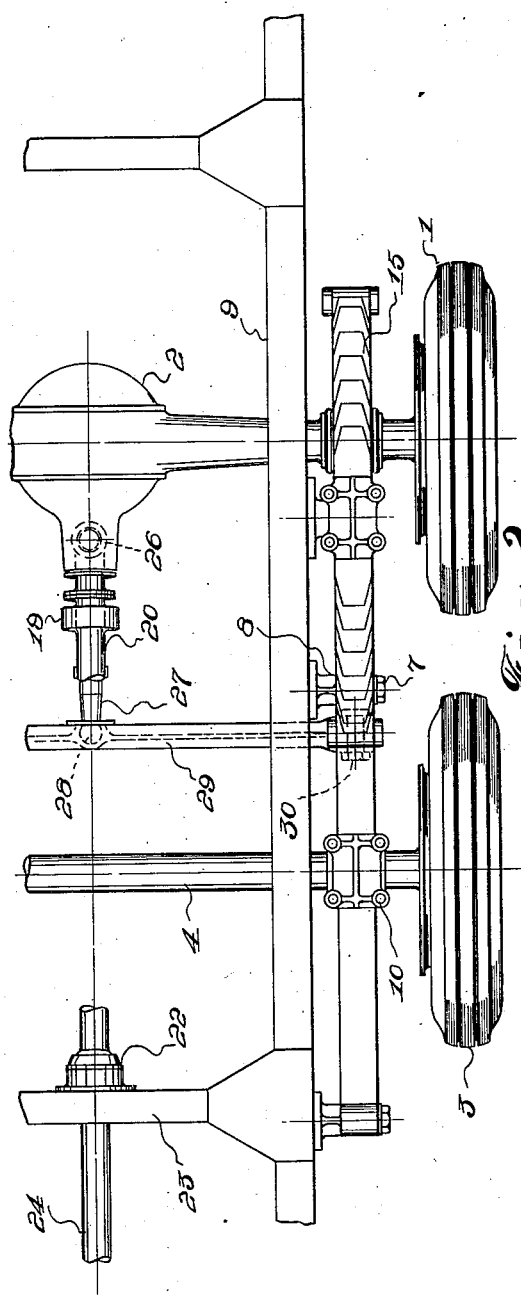
Inventor
Arthur I. Marcum
By William A. Strauch
Attorney

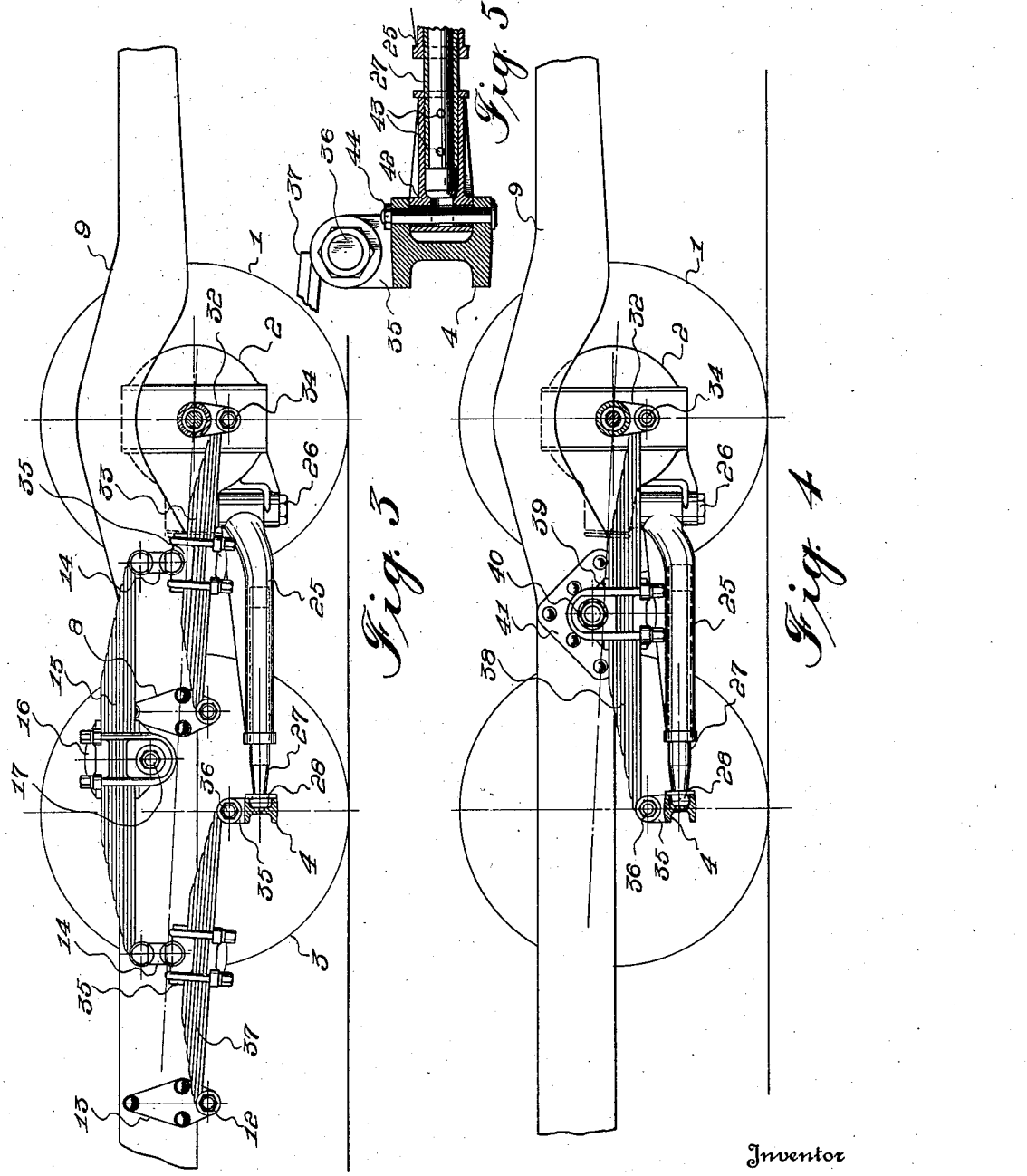

Patented May 10, 1932

1,857,248

UNITED STATES PATENT OFFICE

ARTHUR I. MARCUM, OF OAKLAND, CALIFORNIA, ASSIGNOR, BY MESNE ASSIGNMENTS, TO AUTOMOTIVE ENGINEERING CORPORATION, A CORPORATION OF DELAWARE

VEHICLE DRIVE

Application filed November 27, 1925. Serial No. 71,644.

The present invention relates to improved vehicle driving arrangements.

More particularly the invention relates to improvements in vehicle driving arrangements especially adapted for use in multi-wheel road vehicles or vehicles provided with tandem axles arranged in pairs.

Various types of tandem axle vehicle drives have been heretofore proposed for road vehicles, but it has been found that commercially satisfactory constructions must be such that the flexibility of the spring suspensions is substantially unrestricted by the driving and torquing connections, otherwise shocks are introduced into the mechanisms, the riding qualities are destroyed, and the life is too limited to permit practical operation. Successful arrangements of this character have been recently devised in which both axles of a tandem pair are driven. While satisfactory for commercial use such constructions are relatively high.

Efforts have been heretofore made to provide tandem axle arrangements supporting the rear of road vehicles in which only one of the axles is driven to simplify the construction and reduce the cost of multi-wheel road vehicles. These arrangements have, however, been unsatisfactory for the reason that the frame load on the driven axle is substantially reduced. The traction available is accordingly reduced to such an extent that the loads which may be carried thereby are so small as to make the construction impractical from a commercial viewpoint.

Accordingly an object of the present invention is to provide a tandem axle arrangement for vehicles in which only one axle of the pair is a driving axle and in which the load on the driving axle is increased as the demands for traction increase. This is preferably effected by resisting the torque reactions of the driving axle in a manner to shift the load from the dead axle of the pair to the driving axle with the result that as the torque reductions vary the load on the driving wheels and the tractive effort is correspondingly varied. In this way a simplified tandem axle driving arrangement for multi-wheel road vehicles is provided, in which only one axle need be driven with a corresponding reduction in the cost of construction.

A further object of the invention is to provide novel torquing and driving arrangements for tandem axle road vehicles in which the flexibility of the spring suspension is substantially unrestricted by the driving and torquing connections, in which the load on the driving wheels is varied with the driving torque required, and in which the driving wheels are provided with heavy duty or high pressure pneumatic tires while the remaining wheels are provided with low pressure or balloon tires interchangeable with the heavy duty tires so that the maximum degree of riding comfort and convenience may be attained while sufficient tire capacity is at the same time provided.

Further objects of the invention will appear in the following detailed description of the preferred embodiments thereof, and are such as may be attained by a utilization of the various combinations, sub-combinations and principles more fully hereinafter set forth and as defined by the terms of the appended claims.

Referring to the drawings:

Figure 1 is a sectional side elevation showing a preferred embodiment of the invention.

Figure 2 is a plan view of the form of invention shown in Figure 1.

Figure 3 is a side elevation showing the principal parts of a modified form of the invention.

Figure 4 is a side elevation showing the principal parts of a further modification of the invention.

Figure 5 is a detailed view showing a modified form of connection between the torque arm and the dead axle.

As shown in Figures 1 and 2 a pair of rear wheels 1 support and are driven by a differential drive axle 2 which may be of any well known form and a pair of intermediate wheels 3 support a dead axle 4. Journaled on and depending from the drive axle 2 are the spring supporting saddles 5 from which a pair of spring beams 6 are supported intermediate their ends. The beams 6 are disposed adjacent opposite sides of the vehicle frame and are secured by means of pins 7 which are in axial alignment, to the brackets 8 secured to and supporting the vehicle frame 9. A kick up is preferably provided in the frame 9 over the rear drive axle 2 in order to provide for a low vehicle body support. Dead axle 4 is preferably offset and has mounted thereon the spring supporting saddles 10 in which the spring beams 11 are secured intermediate their ends. One of the saddles 10 is preferably journaled on the axle 4, while the other of the saddles 10 is provided with a torque resisting pin 10', or is secured to axle 4 in any other suitable manner for resisting the tendency of the axle to rotate about the axes of wheels 3. The beams 11 are secured at their forward ends by means of axially aligned pins 12 to the brackets 13 which in turn are secured to and support the frame 9 as shown. Springs 6 and 11 are pivotally connected at their rear ends by means of links 14 to the ends of equalizing spring beams 15. Secured to and supported from the mid portion of each spring 15 is a trunnion member 16 in which the trunnions 17 are rotatably supported. Trunnion pins 17 are secured rigidly to and support the frame supporting brackets 18 which are secured to opposite sides of and support frame 9.

Differential drive axle 2 is driven through a flexible or universal connection 19 by means of a propeller shaft section 20 provided with a telescoping or splined joint 21. At its forward end shaft 20 is driven through a universal drive joint or connection 22 which is supported from frame 9 by means of a suitable cross member 23. Universal joint 22 is driven by the propeller shaft section 24 supported in the frame. To resist the tendency of the axle housing 2 to rotate about the axis of the wheels 1 due to the driving force a torquing socket member 25 is connected to the housing of the axle 2 substantially in the plane of the central longitudinal axis of the vehicle by means of the vertical pivot pin 26. A torque rod 27 fits slidably and rotatably into the socket member 25 and is secured at its forward end by means of a ball and socket connection 28 to cross member 29. Cross member 29 is pivotally connected at its ends by means of the pins 30 to the lower ends of connecting links 31 which at the upper ends are pivotally connected to the rear ends of springs 11.

It will be noted that while the vehicle is at rest the frame load is divided equally between the axles 2 and 4. As is well known, the maximum driving force and tractive effort is ordinarily required to accelerate the vehicle from a condition of rest or while moving. When the vehicle is moving at a uniform rate the demand for driving effort or force on the driving axle is ordinarily substantially reduced. In the present invention the torque reactions are transmitted through the telescopic torque resisting connection from the housing of axle 2 to cross member 29 and the rear ends of springs 11. This tends to raise springs 11 and axle 4 and to shift the load through the equalizing springs 15 to the rear axle 2. As a result the frame load on the driving wheels is increased as the torque is increased causing the tractive effort to vary with the demand for the driving force. It thus will be apparent that the torque transfer mechanism serves as an automatic traction regulating means. With the arrangement disclosed it will be noted that as the vehicle passes over road irregularities the axles 2 and 4 are permitted to oscillate about the axes of pins 7 and 12 respectively and to tilt transversely with relation to the frame, and are permitted to move bodily in such manner that the flexibility of the springs is substantially unrestricted due to torque resisting and driving connections. Tires of different load carrying capacity may accordingly be provided on the different wheels in accordance with the load carried thereby, and at the same time the advantages of low pressure pneumatic tires and of the interchangeability of the tires may be retained.

The form of invention shown in Figures 1 and 2 is modified as shown in Figure 3 by providing a spring suspension in which the frame movement as the vehicle passes over road irregularities is reduced to one quarter of the axle movements except as modified by spring deflections. In this form of the invention the axle 2 is provided with depending lugs 32 to which the rear ends of cantilever springs 33 disposed at opposite sides of frame 9 are connected by means of pins 34. Springs 37 disposed at opposite sides of frame 9 are pivotally connected at their forward ends to the frame 9 by means of axially aligned pins 12 and brackets 13. Secured to and supported from the mid portions of the cantilever springs 33 and 37 are the saddles 35 which are pivotally connected by links 14 to the ends of the equalizing springs 15. Springs 15 are connected to frame 9 by means of trunnion members 16 and 17. Ball 28 of the torquing connection 27 is seated in a socket in the middle of the dead axle 4. The driving and torquing arrangements for the axle 2, and the remaining parts not specifically described are the same as set forth in connection with Figures 1 and 2 and will be understood by a reference to the description thereof above given.

In this form of the invention the torque reactions of the housing of the axle 2 are transmitted directly to and are resisted by the dead axle 4 tending to raise axle 4 and to shift the load from the wheels 3, to axle 2 and wheels 1 as the driving force and torque reactions vary under load conditions.

In the form of invention shown in Figure 4, a single load carrying spring on each side of the frame is substituted for the spring suspension shown in Figure 3. Axles 2 and 4 are connected by pins 34 and 36 to opposite ends of the load carrying springs 38. Secured to and supported from the mid-portions of springs 38 are the frame supporting saddles 39. Saddles 39 rotatably support the trunnions 40 which in turn are rigidly secured to the brackets 41. Brackets 41 in turn are secured to and support frame 9. The driving and torquing connections, for the axle 2 are the same as set forth in connection with Figure 3. Torque reactions are transmitted to the axle 4 tending to raise the wheels 3 and increase the frame load on the wheels 1 as the torque reactions vary.

Instead of the ball and socket connection 28 between the torquing connection 27 and the axles 4 or cross member 29, as shown in Figure 5 the ball end of member 27 may be replaced by a pivot member 42 to which the end of 27 is rigidly secured by means of rivets 43. Member 42 is connected by means of the vertical pivot pin 44 to projections of axle 4 or member 29 as the case may be. As in the forms where ball connections 28 are utilized, the torque reactions are transmitted from axle 2 through members 25 and 27 without substantially restricting utility of the springs.

Various modifications of the present invention will present themselves to those skilled in the art, preferred embodiments only of the invention having been herein set forth. Accordingly what is desired to be secured by Letters Patent and claimed as new is:

1. A road vehicle including a frame, tandem axles supporting one end of said frame, springs connecting each axle individually to said frame, means interconnecting the springs of the axles at the same side of the vehicle; wheels on said axles, mechanism for driving the wheels on only one of said axles, a housing for said driving mechanism, and means connected between said housing and the other axle for resisting the driving torque reaction on said housing and converting it through said springs into downward pressure on the driven wheels.

2. A road vehicle including a frame, tandem axles supporting said frame, springs connecting the axles and frame, wheels on said axles, mechanism for driving the wheels on only one axle, and means connected to and between said axles for resisting the torque reaction due to the driving of said wheels and converting it through said springs into downward pressure on said driven wheels.

3. A road vehicle including a frame, tandem axles, spring suspensions including springs for equalizing the load between said axles under non-driving conditions, wheels on said axles, mechanism for driving the wheels on one of said axles, non-driven wheels on said other axle, and means connected to and between said driving mechanism and said other axle for transmitting the torque reactions due to the driving of said driven wheels to said equalizing springs so that said reactions are converted into downward pressure on the driven wheels.

4. A road vehicle including a frame, tandem axles, beams connecting said axles to said frame so that each axle can swing bodily with reference to a fixed point, means interconnecting said beams and pivoted to said frame to transmit the shocks from one axle to the other axle, wheels on each axle, mechanism to drive one pair of wheels, and a torque arm to resist the torque reaction due to the driving of said wheels, said torque arm being connected to said means and to the axle having the driven wheels.

5. A road vehicle comprising a frame, tandem axles supporting said frame, a spring for each axle pivoted to swing about a pivot secured to the frame, a third spring pivoted to said frame between its ends and connected to said first named springs at its opposite ends, driven wheels on one of said axles, non-driven wheels on said other axle, mechanism to drive said first named wheels and a torque resisting element arranged to transmit the reaction due to the driving torque to said third spring adjacent its connection to the spring individual to the axle carrying the non-driven wheels.

6. The combination defined in claim 5 in which said torque resisting element comprises an arm that is extensible and flexible in directions other than in substantially vertical planes.

7. A road vehicle comprising a frame, tandem axles, a spring for each axle at each side of said frame, each of said springs being secured to the axle between its ends and pivoted to said frame at one of its ends, an intermediate spring pivoted to said frame between its ends and shackled to the other ends of said first named springs, driven wheels on one of said axles, non-driven wheels on the other axle, mechanism to drive said first named wheels, and a torque arm designed to resist the driving torque reactions connected to said intermediate spring adjacent the axle carrying the non-driven wheels.

8. The combination defined in claim 7, in which the driving mechanism is included in a housing and in which the torque arm is pivoted to said housing on a pin whose axis is normally substantially vertical and connected by a ball and socket joint to a cross member connected to said intermediate spring adjacent the axle carrying the non-driven wheels and to the axle having the driven wheels.

9. A road vehicle comprising a frame; a pair of parallel axles disposed adjacent the rear end of said frame; a set of wheels on each axle, the wheels on one axle being non-driven wheels; mechanism for driving the wheels on the other axle; means including a spring pivoted to the frame between its ends for yieldingly connecting said axles to said frame with said spring ends spaced unequally from said other axle and a torque arm secured to the said other axle at one end and having its free end associated with the end of said interconnecting spring most remote from the said other axle whereby the torque reactions are converted through said spring into downward pressure on the wheels supporting said other axle.

10. A road vehicle comprising a frame, a pair of axles arranged beneath said frame, a pair of non-driven wheels supporting the forward axle, a pair of driven wheels supporting the rear axle, means in said rear axle to drive said last named wheels, a propeller shaft connecting said means, means inter-connecting said axle and frame including a spring pivoted between its ends to the frame with said ends positioned at unequal distances from said rear axle, an extensible and laterally flexible torque arm secured to said rear axle at one end and having its opposite end arranged so that the forces tending to raise the other end of said arm are transmitted to the end of said spring remote from the driven axle whereby the torque reactions are converted into downward pressure on the driven wheels by said spring.

11. In a vehicle construction, a chassis frame; driving and dead axles arranged in tandem beneath one end of said frame; a spring suspension interconnecting said axles and said frame; and torque resisting means connected at one end thereof with the driving axle to swing therewith and connected at its other end to a portion of said spring suspension adjacent the dead axle to move vertically therewith during operation of the vehicle.

12. In the construction defined in claim 11, said last mentioned means comprising a flexible and extensible torque resisting device.

13. In a multi-wheel construction, a frame; several sets of wheels disposed in tandem at one end of said frame; a suspension, including axles, for interconnecting said frame and said wheels to support the former upon the latter; mechanism for driving one set of wheels, the adjacent set being non-driven; and torque-resisting means, connected adjacent one end with said driving mechanism to receive torque reactions therefrom, and connected adjacent the other end with a portion of said suspension to swing therewith and thereby utilize the driving torque reactions for increasing the traction on said driven wheels by automatically decreasing the load upon said non-driven wheels.

14. In combination with a chassis frame having tandem sets of wheels designed to swing substantially vertically relative to one end of said frame; driving mechanism for one set of said wheels, the other set being idle wheels; and automatic traction regulating means having a connection with said driving mechanism, and also having a connection with said idle wheels to swing therewith during operation, said regulating means and its connections being designed to transfer the torque reactions of said driving mechanism to said idle wheels, whereby the load on the latter is varied in response to variations in driving torque.

In testimony whereof I affix my signature.
ARTHUR I. MARCUM.